June 28, 1927.
G. H. SCHLETER
FAN
Filed Sept. 7, 1926
1,633,957
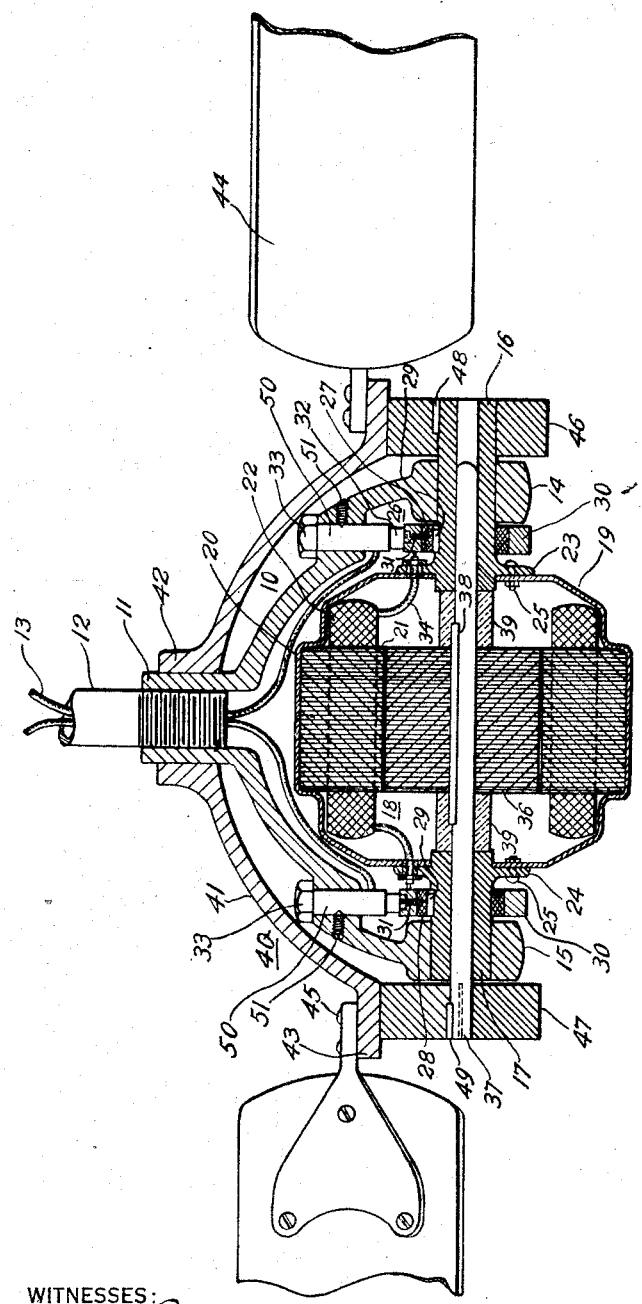
WITNESSES:
INVENTOR
George H. Schleter
BY
ATTORNEY Patented June 28, 1927.

1,633,957

UNITED STATES PATENT OFFICE.

GEORGE H. SCHLETER, OF SWISSVALE, PENNSYLVANIA, ASSIGNOR TO WESTINGHOUSE ELECTRIC & MANUFACTURING COMPANY, A CORPORATION OF PENNSYLVANIA.

FAN.

Application filed September 7, 1926. Serial No. 133,799.

This invention relates to fans, and more particularly to slow-speed ceiling fans.

The object of the invention, generally stated, is the provision of a slow-speed ceiling fan that shall be simple and efficient in operation and readily and economically manufactured.

A more specific object of the invention is to provide for driving a fan wheel at a slow speed without the use of reduction gears.

Another object of the invention is to utilize the weight of a fan wheel to maintain engagement between the driving and the driven members.

It is also an object of the invention to provide for the utilization of both rotating members of a motor comprising rotatable field and armature windings for driving a fan wheel.

Further objects of the invention will, in part, be obvious and, in part, appear hereinafter.

This invention, accordingly, is disclosed in the embodiment thereof shown in the accompanying drawings and comprises the features of construction, the combination of elements and the arrangement of parts which will be exemplified in the construction hereinafter set forth, and the scope of the application of which will be indicated in the claims.

For a fuller understanding of the objects of the invention, reference should be had to the following detailed description, taken in connection with the accompanying drawings, in which; the single figure is a vertical sectional view of a motor-driven ceiling fan constructed in accordance with this invention.

Referring now to the drawing, 10 designates generally a frame having a threaded opening 11 in its upper end for the reception of a threaded hanger, such as shown at 12. The hanger is preferably made in the form of a conduit so that it may be used for enclosing the conductors 13, which are provided for connecting the fan motor with any source of power supply.

In order to adapt the frame for supporting a motor, bearings 14 and 15 are provided thereon. As shown, these bearings are disposed in opposite sides of the frame and in an alinement.

In order to obtain the slow-speed drive for the fan wheel without the use of gears, a motor provided with rotatable field and armature windings is utilized. As illustrated, the field windings 18 are mounted on the sleeves 16 and 17, while the rotor 36 is positioned on the shaft 37.

As shown, a casing 19 is provided for supporting the field windings 18 on the sleeves 16 and 17. It will be readily understood that the windings may be fixed in position in a casing in any suitable manner, and, in this particular construction, the casing is provided with circumferential shoulders which engage opposite faces of the laminated cores 20 of the field windings. In mounting the field windings in the casing 19, which is preferably made of steel, a blank form is pressed into shape to engage the core after the latter has been assembled. The core may be composed of a plurality of annular plates provided with inwardly extending projections 21 carrying the conductor coils 22.

As illustrated, the sleeves 16 and 17 are provided with flanges 23 and 24 to which the casing 19 is attached by the use of bolts 25. In this manner, the casing and field windings are rotatably mounted in the bearings 14 and 15.

In order to connect the field windings with any source of electrical energy, a brush-and-ring device, shown generally at 26, is utilized. As will be observed, two insulating rings 27 and 28 are fixed to the sleeves 16 and 17, respectively, by means of keys 29. Conductor rings 30 are mounted on the insulating rings 27 and 28 and are fastened in position by any suitable means, such as countersunk screws 31.

Brushes 32 are mounted in brush-holders 50 and are disposed to ride on the rings 30. In this construction, the brush-holders are supported in the frame 10 by set screws 51. Since it is necessary to insulate the brushes from the frame, the brush-holders are composed of some insulating material. The upper ends of the brush-holders are protected by caps 33 which may be removed to permit removal and replacement of the brushes.

As shown, the conductors 13 are electrically connected to the brushes 32. The conductor rings 30, on which the brushes 32 ride, are connected to the coils 22 of the field windings by means of conductors 34 which extend through bushings 35 mounted in the casing 19.

In mounting the armature windings 36 for rotation, a shaft 37 is utilized. As illustrated, the armature windings are fixed in position on the shaft 37 by means of a key 38. In order to retain the armature properly positioned, sleeves 39, preferably made of some insulating material, are mounted on the shaft 37 and interposed between the sleeve bearings 16 and 17 and the armature.

The fan wheel, shown generally at 40, comprises a spider 41 provided with a hub 42 that may be rotatably mounted on the upwardly extending portion of the frame 10 provided for receiving the conduit 12. The hub 42 may also move longitudinally of its axis.

In order to establish driving connections between the fan wheel and the rotating members of the motor, a track 43 is suspended from the spider 41. In this particular embodiment of the invention, the track 43 is formed integral with the spider but it will be readily understood that it may be attached in any suitable manner. The fan blades 44 are mounted on the track 43 by means of screws 45.

Driving connections between the track and the motor field and armature windings is established through drive wheels 46 and 47 located at opposite ends of the motor.

The drive wheels may be of any suitable material having the proper coefficient of friction for establishing the proper driving connection with the track 43. In this construction, the driving connection will be maintained by the weight of the fan wheel.

As illustrated, the drive wheel 46 is fixed to the sleeve bearing 16 by means of a key 48, while the drive wheel 47 is retained in position on the shaft 37 by means of a key 49. In this manner, the drive wheels are disposed at opposite ends of the motor and are connected to the different rotating members.

It will be readily appreciated that, when the motor is energized, the field and armature windings will rotate in opposite direction, thus rotating the drive wheels 46 and 47 in opposite directions about a common axis, which is the axis of the shaft 37. Accordingly, the drive wheels 46 and 47 will tend to rotate the track 43 and, therefore, the fan wheel 40 in the same direction.

The speed of the fan wheel 40 will depend on the size of the drive wheels 46 and 47 and the diameter of the track 43. Thus, it will be evident that, by varying the sizes of the drive members, any desired speed may be obtained.

I would state, in conclusion, that, while the illustrated example constitutes a practical embodiment of my invention, I do not limit myself to the exact details herein illustrated, since modifications of the same may be made without departing from the spirit of the invention as defined in the appended claims.

I claim as my invention:

1. In a fan, in combination, a stationary motor provided with rotatably mounted field and armature windings, drive wheels disposed for operation by the field and armature windings, a rotatable track engaging the drive wheels, and fan blades carried by the track.

2. In a fan, in combination, a frame, a fan wheel rotatably mounted on the frame, drive wheels disposed on opposite sides of the axis of the fan wheel, and a motor provided with rotatable field and armature windings carried by the frame and connected to the drive wheels to rotate them in opposite directions to drive the fan wheel.

3. In a fan, in combination, a stationary motor provided with rotatable field and armature windings, drive wheels disposed for operation by said field and armature windings, said drive wheels being disposed for operation by the field and armature windings and to rotate about a common axis, a rotatable circular track engaged by the drive wheels, and fan blades carried by the track.

4. In a fan, in combination, a stationary motor provided with rotatable field and armature windings, drive wheels disposed for operation by said field and armature windings, said drive wheels being disposed at opposite ends of the motor for operation by the field and armature windings and to rotate about a common axis, a member mounted to rotate about an axis located between the drive wheels, and fan blades carried by said rotatable member.

5. In a fan, in combination, a frame, a stationary motor provided with rotatable field and armature windings carried by the frame, drive wheels disposed at opposite ends of the motor for operation by the field and armature windings, a track carried by the drive wheels, and fan blades carried by the track.

6. In a fan, in combination, a motor provided with rotatably mounted field and armature windings, a fan wheel, and means for utilizing both windings to actuate directly the fan wheel.

7. In a fan, in combination, a motor provided with field and armature windings, means for rotatably mounting the field and armature windings, drive wheels disposed at opposite ends of the motor for rotation in opposite directions by the field and armature windings, and a fan wheel mounted for operation by the drive wheels.

8. In a fan, in combination, a frame, a plurality of sleeves rotatably mounted in the frame, a shaft rotatably mounted in the sleeves, a motor provided with rotatable field and armature windings, the field windings being carried by the sleeves and the armature windings by the shaft, drive wheels disposed at opposite ends of the motor, one mounted on the shaft and the other on one of the sleeves to turn in opposite directions when the motor is operated, and a fan wheel provided with a plurality of fan blades carried by the drive wheels.

9. In a fan, in combination, a motor provided with rotatably mounted field and armature windings, a fan wheel, and means for utilizing the field and armature windings to actuate the fan wheel, the fan-wheel actuating means including drive means operated from both ends of the motor.

10. In a fan, in combination, a motor provided with rotatably mounted field and armature windings, a fan wheel disposed to be actuated by the motor windings and means disposed between each motor winding and the fan wheel to effect the actuation of the fan wheel by the cooperative action of the windings.

In testimony whereof, I have hereunto subscribed my name this first day of September, 1926.

GEORGE H. SCHLETER.